Patented Feb. 27, 1945

2,370,512

UNITED STATES PATENT OFFICE 2,370,512

DEHYDROGENATION OF ALKENES

James L. Amos, Midland, and Frederick J. Soderquist, Bay City, Mich., assignors to The Dow Chemical Company, Midland, Mich., a corporation of Michigan No Drawing. Application February 28, 1942, Serial No. 432,824

17 Claims. (Cl. 260—680)

This invention relates to the dehydrogenation of alkenes and more particularly to the dehydrogenation of the same to form conjugated diolefins.

It is known that certain alkenes may be dehydrogenated under the influence of heat and solid catalytic bodies, such as metal compounds, porous substances, etc., to form conjugated diolefins. However, in previously known processes for carrying out such dehydrogenation, difficulty has been experienced due to low conversion of the alkene to diolefin, to the cracking of the alkene to form relatively large amounts of compounds containing a smaller number of carbon atoms in the molecule, and to the rapid deposition of carbon on the catalyst body employed, thus rendering the latter ineffective after a short period of time.

We have found that alkenes having four to five carbon atoms in the molecule and having an unsaturated straight chain of at least four carbon atoms may be dehydrogenated readily, and with a high conversion during a single pass through the reaction zone, to form conjugated diolefins by pyrolyzing in the presence of water vapor and a compound selected from the class consisting of selenium dioxide and selenium compounds which decompose under the reaction conditions to form a selenium oxide or acid. We have further found that, when the dehydrogenation is carried out in this manner, the use of the usual solid catalytic bodies, such as metal compounds, porous substances, etc., is unnecessary and consequently the necessity of frequently stopping the operation to clean or regenerate such solid catalyst is avoided. By using a selenium compound of the class described to promote the reaction, carbonization may be greatly reduced and the amount of cracking to form by-products having fewer carbon atoms than in the molecule of the alkene reactant may be reduced below that usual when employing solid catalysts only in the reaction. An additional advantage resulting from the use of such selenium catalyst is that a crude diolefin fraction containing an exceptionally high proportion of diolefin may be recovered from the reacted mixture, thus greatly facilitating isolation of purified diolefin from the fraction.

The dehydrogenation is carried out in any suitable manner, e. g. by passing the alkene, water and selenium compound, usually in vapor phase, through heated tubes. Although the process is preferably carried out in the absence of the usual solid catalytic bodies, it should be mentioned that such catalytic bodies may be employed if desired. In some instances the use of such solid catalytic body will even lead to an appreciably better yield of diolefin than when it is omitted. Also, the use of water vapor and a selenium compound in the reaction mixture decreases the deposition of free carbon on the catalytic body and increases the length of time over which the latter may be used without regeneration. However, the advantages gained by the use of such solid catalytic bodies do not usually justify the added expense and inconvenience involved. It should also be mentioned that, as disclosed in our copending application, Serial No. 432,825 the use of a hydrogen halide or a compound which decomposes under the conditions of the dehydrogenation to form a hydrogen halide, e. g. mono- or poly-halohydrocarbons, halohydrins, halocarboxylic acids, halo esters, etc., in conjunction with the selenium dioxide is advantageous in promoting the dehydrogenation of alkenes to form diolefins.

The alkene, which may comprise 1-butene, 2-butene, 2-methyl-1-butene, 2-methyl-2-butene, 2-methyl-3-butene, 1-pentene, or 2-pentene may arise in any of a number of ways, such as by a cracking operation, by dehydrogenation of a paraffin hydrocarbon, or by the elimination of a hydrogen halide from a haloparaffin. Although the purity of the reaction product depends somewhat on the purity of the alkene used, the invention contemplates the use of the alkene or mixtures thereof with at least minor proportions of other hydrocarbons such as propane, butane, pentane, propene, isobutene, etc. Although selenium dioxide and selenium compounds which decompose under the reaction conditions to form a selenium acid may be used to catalyze the dehydrogenation, the invention will, for the sake of convenience, be described with reference to the use of selenium dioxide. The proportions of the ingredients in the reaction mixture will, of course, vary somewhat with the particular alkene which is used and with the conditions under which the dehydrogenation is carried out. Less than one mol, and usually from 0.01 to 0.6 mol, of selenium dioxide is used for each mol of alkene. From 1 to 60 mols, and preferably from 3 to 45 mols, of water is usually employed for each mol of alkene, although larger proportions may be used. It is, of course, obvious that the use of excessive proportions of water may render the process less economical due to the larger amount of heat required to bring the mixture to the pyrolyzing temperature.

The reactants may be preheated separately before being mixed together and subjected to the pyrolysis, or they may be heated after being mixed, if desired. The selenium dioxide may be conveniently introduced into the reaction mixture along with the water in the form of a solution, both the water and the selenium dioxide being vaporized under the conditions of the dehydrogenation. The steam or the vaporized selenium dioxide solution may be advantageously superheated and mixed with the other ingredients to supply the heat of pyrolysis to the mixture.

Although the temperature depends somewhat upon the alkene used and the proportion thereof in the reaction mixture, the dehydrogenation is carried out at temperatures between 600° and 950° C., preferably between 650° and 900° C. The time of pyrolysis is usually measured by the space velocity of the alkene within the reaction zone. The space velocity of the alkene may be defined as the number of cubic feet of gaseous alkene, referred to standard conditions of 0° C., and 760 mm. of mercury pressure, passing through the reaction zone per hour per cubic foot of reaction zone. It should be noted that the space velocity as defined above refers to the alkene in the reaction mixture and not to the reaction mixture as such. Thus, the space velocity of the alkene may be spoken of independently of the composition of the reaction mixture. The space velocity of the alkene is usually maintained between 200 and 600, and preferably between 250 and 500. Higher or lower space velocities may, of course, be maintained if desired. The dehydrogenation is usually carried out at atmospheric pressure, but higher or lower pressures may be used.

The pyrolyzed mixture comprises hydrogen selenide formed during the reaction, water vapor, the conjugated diolefin, i. e. 1.3-butadiene or a methyl butadiene, any unconverted alkene, and a hydrogen halide in case a hydrogen halide or a decomposable halogen compound is used in conjunction with the selenium dioxide, together usually with minor amounts of saturated and unsaturated hydrocarbons having a different number of carbon atoms in the molecule than the alkene used. The mixture may be treated in any one of a number of ways to recover the conjugated diolefin formed during the pyrolysis. For example, the gaseous mixture may be cooled to condense out an aqueous solution containing most of the hydrogen halide, if present, and the solution may be either discarded or returned to the pyrolysis step. The uncondensed portion may be scrubbed with water to remove any remaining traces of hydrogen halide, and the washed gases then fractionally condensed to recover the unreacted alkene and the formed diolefin as a liquid fraction containing a high concentration of the latter. The mixture of alkene and diolefin may then be separated into its components in known manner, e. g. by extraction with a selective solvent for the diolefin or by reaction of the diolefin with a reagent such as cuprous chloride to form an insoluble complex salt, to recover substantially pure conjugated diolefin and an alkene fraction which may, if desired, be returned to the pyrolyzing step. The hydrogen selenide, in the reacted mixture although partially removed during the scrubbing with water, is contained principally in the vent gases after separation of the fraction containing the alkene and diolefin. The vent gases may be discarded or they may, if desired, be burned to recover the selenium as the dioxide which may be re-used in the pyrolysis step. In some instances the mixture of alkene and diolefin may be used directly as a source of diolefin, e. g. in the preparation of sulfones of diolefins by selective reaction of the diolefin in the hydrocarbon mixture with sulfur dioxide.

The following example describes one way in which the principle of the invention may be applied, but is not to be construed as limiting its scope.

Example

A mixture consisting of 1.69 mols 1-butene, 47.4 mols steam, and 0.85 mol selenium dioxide was passed at atmospheric pressure and a space velocity of the 1-butene of 150 through a reaction chamber packed with activated charcoal. The reaction chamber was maintained at a temperature of about 700° C. throughout the experiment. The reacted mixture was cooled to condense most of the water vapor which was separated and the gaseous mixture then further cooled to condense a liquid fraction containing 0.676 mol unreacted 1-butene and 0.137 mol 1.3-butadiene. Most of the selenium issued with the vent gases in the form of hydrogen selenide.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. The method for preparing a conjugated diolefin which consists in passing a mixture comprising an alkene containing from four to five carbon atoms in the molecule and having an unsaturated straight chain of at least four carbon atoms, water vapor and a compound selected from the class consisting of selenium dioxide and selenium compounds which decompose under the conditions of the reaction to form a selenium oxide through a reaction zone maintained at a dehydrogenation temperature.

2. The method for preparing a conjugated diolefin which consists in passing a mixture comprising an alkene containing from four to five carbon atoms in the molecule and having an unsaturated straight chain of at least four carbon atoms, water vapor and selenium dioxide through a reaction zone maintained at a dehydrogenation temperature.

3. The method for preparing a conjugated diolefin which consists in passing a mixture comprising an alkene containing from four to five carbon atoms in the molecule and having an unsaturated straight chain of at least four carbon atoms, water vapor and selenium dioxide through a reaction zone maintained at a temperature in the range 600° to 950° C.

4. The method for preparing a conjugated diolefin which consists in passing a mixture comprising an alkene containing from four to five carbon atoms in the molecule and having an unsaturated straight chain of at least four carbon atoms, water vapor and selenium dioxide through a reaction zone maintained at a temperature in the range 650° to 900° C.

5. The method for preparing a conjugated diolefin which consists in passing a mixture comprising an alkene containing from four to five carbon atoms in the molecule and having an unsaturated straight chain of at least four carbon atoms, water vapor and selenium dioxide at a space velocity of 200 to 600 through a reaction zone maintained at a temperature in the range 650° to 900° C.

6. The method for preparing a conjugated diolefin which consists in passing a mixture comprising an alkene containing from four to five carbon atoms in the molecule and having an unsaturated straight chain of at least four carbon atoms, water vapor and selenium dioxide at a space velocity of 250 to 500 through a reaction zone maintained at a temperature in the range 650° to 900° C. and recovering a conjugated diolefin from the reacted mixture.

7. The method for preparing a conjugated diolefin which consists in passing a mixture comprising one molecular proportion of an alkene containing from four to five carbon atoms in the molecule and having an unsaturated straight chain of at least four carbon atoms, from 1 to 60 molecular proportions of water vapor, and selenium dioxide in an amount less than one molecular proportion at a space velocity of 200 to 600 through a reaction zone maintained at a temperature in the range 650° to 900° C.

8. The method for preparing a conjugated diolefin which consists in passing a mixture comprising one molecular proportion of an alkene containing from four to five carbon atoms in the molecule and having an unsaturated straight chain of at least four carbon atoms, from 3 to 45 molecular proportions of water vapor, and from 0.01 to 0.6 molecular proportions of selenium dioxide at a space velocity of 200 to 600 through a reaction zone maintained at a temperature in the range 650° to 900° C. and recovering a conjugated diolefin from the reacted mixture.

9. The method for preparing a methyl butadiene which consists in passing a mixture comprising a pentene having an unsaturated straight chain of at least four carbon atoms, water vapor and selenium dioxide through a reaction zone maintained at a dehydrogenation temperature.

10. The method for preparing 1.3-butadiene which consists in passing a mixture comprising a normal butene, water vapor and selenium dioxide through a reaction zone maintained at a dehydrogenation temperature.

11. The method for preparing 1.3-butadiene which consists in passing a mixture comprising a normal butene, water vapor and selenium dioxide through a reaction zone maintained at a temperature in the range 600° to 950° C.

12. The method for preparing 1.3-butadiene which consists in passing a mixture comprising a normal butene, water vapor and selenium dioxide through a reaction zone maintained at a temperature in the range 650° to 900° C.

13. The method for preparing 1.3-butadiene which consists in passing a mixture comprising a normal butene, water vapor and selenium dioxide at a space velocity of 200 to 600 through a reaction zone maintained at a temperature in the range 650° to 900° C.

14. The method for preparing 1.3-butadiene which consists in passing a mixture comprising a normal butene, water vapor and selenium dioxide at a space velocity of 250 to 550 through a reaction zone maintained at a temperature in the range 650° to 900° C.

15. The method for preparing 1.3-butadiene which consists in passing a mixture comprising one molecular proportion of a normal butene, from 1 to 60 molecular proportions of water vapor, and selenium dioxide in an amount less than one molecular proportion at a space velocity of 200 to 600 through a reaction zone maintained at a temperature in the range 650° to 900° C.

16. The method for preparing 1.3-butadiene which consists in passing a mixture comprising one molecular proportion of a normal butene, from 3 to 45 molecular proportions of water vapor, and from 0.01 to 0.6 molecular proportions of selenium dioxide at a space velocity of 200 to 600 through a reaction zone maintained at a temperature in the range 650° to 900° C. and recovering 1.3-butadiene from the reacted mixture.

17. In a method for preparing a conjugated diolefin wherein an alkene containing from four to five carbon atoms in the molecule and having an unsaturated straight chain of at least four carbon atoms is dehydrogenated, the step which consists in passing the alkene, in admixture with water vapor and a compound selected from the class consisting of selenium dioxide and selenium compounds which decompose under the reaction conditions to form a selenium oxide, through a reaction zone maintained at a dehydrogenation temperature.

JAMES L. AMOS.
FREDERICK J. SODERQUIST.